(12) United States Patent
George et al.

(10) Patent No.: US 9,611,420 B2
(45) Date of Patent: Apr. 4, 2017

(54) CROSSLINKING CHITOSAN FOR REDUCING PERMEABILITY IN A WELL

(71) Applicant: Halliburton Energy Services, Inc., Houston, TX (US)

(72) Inventors: Shoy C. George, Thrissur (IN); Prajakta Ratnakar Patil, Pune (IN); Prasanta Das, Laskarpur (IN)

(73) Assignee: Halliburton Energy Services, Inc., Houston, TX (US)

( * ) Notice: Subject to any disclaimer, the term of this patent is extended or adjusted under 35 U.S.C. 154(b) by 407 days.

(21) Appl. No.: 13/887,536

(22) Filed: May 6, 2013

(65) Prior Publication Data

US 2014/0329724 A1 Nov. 6, 2014

(51) Int. Cl.
   *C09K 8/514* (2006.01)
   *C09K 8/512* (2006.01)
   *C09K 8/575* (2006.01)

(52) U.S. Cl.
   CPC ............. *C09K 8/514* (2013.01); *C09K 8/512* (2013.01); *C09K 8/5756* (2013.01); *C09K 8/5758* (2013.01)

(58) Field of Classification Search
   CPC ........ C09K 8/905; C09K 8/512; C09K 8/514; C09K 8/5756; C09K 8/5758
   USPC .................................................. 507/211, 268
   See application file for complete search history.

(56) References Cited

U.S. PATENT DOCUMENTS

| | | | |
|---|---|---|---|
| 5,320,171 A | 6/1994 | Laramay | |
| 5,599,916 A | 2/1997 | Dutkiewicz et al. | |
| 6,291,404 B2* | 9/2001 | House | 507/110 |
| 6,358,889 B2 | 3/2002 | Waggenspack et al. | |
| 6,607,035 B1 | 8/2003 | Reddy et al. | |
| 6,764,981 B1 | 7/2004 | Eoff et al. | |
| 6,981,552 B2* | 1/2006 | Reddy | C09K 8/12 166/294 |
| 7,325,613 B2 | 2/2008 | Reddy et al. | |
| 7,563,750 B2 | 7/2009 | Eoff et al. | |
| 7,759,282 B2 | 7/2010 | Serban et al. | |
| 2010/0256023 A1 | 10/2010 | Pauls et al. | |

OTHER PUBLICATIONS

B.R. Reddy, Larry Eoff, E. Dalrymple, Kathy Black, David Brown, and Marcel Rietjens, "A Natural Polymer-Based Cross-Linker System for Conformance Gel Systems," SPE 84937, Jun. 2003 SPE Journal, 2002 SPE/DOE Improved Oil Recovery Symposium, Tulsa, OK, Apr. 13-17, 2003, 8 pages.

* cited by examiner

*Primary Examiner* — Frances Tischler
(74) *Attorney, Agent, or Firm* — Craig Roddy; Baker Botts L.L.P.

(57) ABSTRACT

A composition including: (a) an aqueous phase; (b) a chitosan-based compound dispersed or dissolved in the aqueous phase; and (c) a crosslinker dispersed or dissolved in the aqueous phase, wherein the crosslinker has at least two functional groups independently selected from the group consisting of aldehyde, carboxylic acid, and carboxylate. A method including the step of introducing a composition according to the invention into a treatment zone of a well.

8 Claims, 2 Drawing Sheets

CROSSLINKING CHITOSAN FOR REDUCING PERMEABILITY IN A WELL

CROSS-REFERENCE TO RELATED APPLICATIONS

Not applicable.

TECHNICAL FIELD

The inventions are in the field of producing crude oil or natural gas from subterranean formations. More specifically, the inventions generally relate to reducing the permeability of subterranean formation in a well. This can be useful, for example, for reducing excessive water production during the production of oil or gas or blocking water production from a zone.

BACKGROUND

In certain subterranean formations, it may be desirable to mitigate the flow of fluids through a portion of the subterranean formation that is penetrated by a well.

For example, water production from oil or gas wells is a widespread problem that causes significant economic drawbacks. High water production rates reduce well productivity, increase operating expenditures, and can completely block production from wells. Controlling and eliminating unwanted water influx into oil or gas wells is a major concern of producers.

The water can be the result of a water-producing zone communicating with the oil or gas producing zone by fractures, high-permeability streaks, fissures, vugs, or the like, or it can be caused by a variety of other occurrences which are well known to those skilled in the art such as water coning, water cresting, bottom water, channeling at the well bore, etc. The water may approach from one or more directions (from below, from the sides, or from above). Usually water is produced at the cost of oil or gas recovery. In some circumstances, the ratio of produced water to hydrocarbons may, over time, become sufficiently high that the cost of producing, separating, and disposing of the water may represent a significant economic loss. In severe cases, the water influx becomes so great that the oil or gas production is choked off completely.

In some instances, it may be desirable to control the flow of fluids introduced into the well so that the flow of the fluid into high-permeability portions of the formation is mitigated. In enhanced recovery techniques such as water flooding, an aqueous flood or displacement fluid is injected under pressure into an oil containing subterranean formation by way of one or more injection wells. The flow of the aqueous fluid through the formation displaces oil or gas and drives it to one or more producing wells. However, the aqueous displacement fluid tends to flow through the most permeable zones in the subterranean formation, whereby less permeable zones containing oil or gas are bypassed. This uneven flow of the aqueous displacement fluid through the formation reduces the overall yield of hydrocarbons from the formation. For example, in an injection well, it may be desirable to seal off high-permeability portions of a subterranean formation that otherwise would accept larger portions of an injected treatment fluid. By sealing off the high-permeability portions of the subterranean formation, the injected treatment fluid thus may penetrate less permeable portions of the subterranean formation more effectively.

Heretofore, enhanced recovery problems in a subterranean oil containing formation caused by permeability variations therein have been corrected by reducing the permeability of the subterranean formation flow paths. The techniques utilized to accomplish this reduction in the permeability of high permeability zones are sometimes referred to in the art as "conformance control techniques." Decreasing excess water production increases the production water/oil ratio ("WOR"), lowering water-handling cost. Conformance control techniques can extend a well's economic life, increasing return on investment. Oil production increases as water production decreases.

A number of methods for controlling water production from subterranean formations have been proposed. For example, methods include processes designed to block pores or channels within a formation by gelation using polymer materials such as polyvinyl alcohol and polyacrylic acid. See, for example, U.S. Pat. Nos. 7,759,292 and 7,563,750, which are incorporated herein by reference. See also, for example, Great Britain Patent No. GB-A-2399364.

Another method that has been proposed involves introducing a barrier, such as a concrete resin, adjacent to the well bore in order to prevent the movement of water into the bore.

More recently, methods to achieve selective water control without the need for zonal isolation techniques comprising hydrophilic polymers have been proposed. It is thought that the hydrophilicity of the polymer affords the desired selectivity. It leads to preferential partition into those channels and pores of the formation having high levels of water without impairment to oil and gas production.

A drawback with the polymers used for water shut-off treatment is that they are partially unstable at high temperatures (i.e., greater than 110° C.). Also, some polymers have a tendency of precipitation at higher temperature in the presence of acid and saturated heavy brines See US Patent Publication No. 2010/0256023, which is incorporated herein by reference. Exposure to such temperatures and/or chemicals can cause the polymers to decompose and/or degrade thereby nullifying their blocking effect. When this occurs, the formation then has to be re-treated which increases the cost further.

Polyacrylamide is commonly used as one of the polymers in water shut-off. Unfortunately, it is potentially damaging the environment because the acrylamide monomer produced on decomposition of polyacrylamide is known to be a nerve toxin.

U.S. Pat. No. 7,325,613 issued Feb. 5, 2008 entitled "Crosslinkable polymer compositions comprising phenols and associated methods" discloses as described in the abstract "Crosslinkable-polymer compositions that comprise a chitosan-based compound and a phenol source, and associated methods, are provided. Various methods of use are also provided," U.S. Pat. No. 7,325,613 is incorporated by reference in its entirety.

Excessive water production greatly affects the economic life of producing wells. High water cut largely affects the economic life of producing wells and is also responsible for many oilfield-related damage mechanisms, such as scale deposition, fines migration. Though a variety of chemicals are used by the industry to control water production, most of them are not accepted in the regions with strict environmental regulations.

There is a continuing need for improved methods for controlling or blocking water production from certain subterranean zones. It would also be desirable for the methods to avoid risking damage the environment.

SUMMARY OF THE INVENTION

This invention disclosure provides compositions and methods for reducing, plugging, or sealing undesired permeability in a subterranean formation, such as permeability from a water or gas producing zone. The newly developed conformance sealant is based on environmentally acceptable chemistry that incorporates a chitosan-based compound and a crosslinker. Chitosan is considered environmentally benign. Preferably, the crosslinker is also selected for being non-toxic, biodegradable, or environmentally acceptable.

In general, a composition is provided, wherein the composition includes: (a) an aqueous phase; (b) a chitosan-based compound dispersed or dissolved in the aqueous phase; and (c) a crosslinker dispersed or dissolved in the aqueous phase, wherein the crosslinker has at least two functional groups independently selected from the group consisting of aldehyde, carboxylic acid, and carboxylate.

A method of treating a well is provided, the method including the step of introducing a composition according to the invention into a treatment zone of a well.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

BRIEF DESCRIPTION OF THE DRAWING

The accompanying drawing is incorporated into the specification to help illustrate examples according to the presently most-preferred embodiment of the invention. It should be understood that the figures of the drawing are not necessarily to scale.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

Patent Terms

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it. In the context of formation evaluation, a subterranean formation refers to the volume of rock seen by a measurement made through a wellbore, as in a log or a well test. These measurements indicate the physical properties of this volume of rock, such as the property of permeability.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Conventional Reservoirs

There are conventional and non-conventional types of reservoirs.

In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milli-Darcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestone, dolomite, sandstone, or a combination of these.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, a "fluid" broadly refers to any fluid adapted to be introduced into a well for any purpose. A fluid can be, for example, a drilling fluid, a setting composition, a treatment fluid, or a spacer fluid.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Polymers and Derivatives

As used herein, a "polymer" or "polymeric material" includes polymers, copolymers, terpolymers, etc. In addition, the term "copolymer" as used herein is not limited to the combination of polymers having two monomeric units, but includes any combination of monomeric units, e.g., terpolymers, tetrapolymers, etc.

As used herein, "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

The term, "modified," as used herein, refers to a polymer grafted or modified with additional functional groups, including, but not limited to, carboxymethyl groups, hydroxyethyl groups, hydroxypropyl groups, derivatives thereof, or combinations thereof. Other functional group modifications may be suitable as recognized by one skilled in the art with the benefit of this disclosure.

Hydratability, and Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

In the context of a fluid, oil is understood to refer to any kind of an oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. All oils, even synthetic oils, can be traced back to organic sources.

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with a light oil having an API gravity of greater than 31.1 degrees.

As used herein, "high permeability" means the material has a permeability of at least 100 millidarcy (mD). As used herein, "low permeability" means the material has a permeability of less than 1 mD.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

Converted to SI units, 1 darcy is equivalent to $9.869233 \times 10^{-13}$ m$^2$ or 0.9869233 $(\mu m)^2$. This conversion is usually approximated as 1 $(\mu m)^2$.

Reducing Permeability of a Zone

In reducing the permeability of a zone, it is desirable to form a crosslinked gel in the zone, not at the surface or prematurely during pumping of a treatment fluid. If the crosslinking occurs prematurely, the crosslinked fluid or gel has a high viscosity, which can be difficult to pump downhole and place where desired in a treatment zone. Accordingly, it is important to control the timing of the crosslinking reaction. In addition, it is desirable to avoid the need to pump two separate fluids that interact downhole, for example, one as a base gel and a separate fluid with the crosslinker.

The invention uses a chitosan-based compound and a di-functional crosslinker to form a gel that can be used to reduce the permeability of a zone in a well.

In general, a composition for treating a well is provided, wherein the composition includes: (a) an aqueous phase; (b) a chitosan-based compound dispersed or dissolved in the aqueous phase; and (c) a crosslinker dispersed or dissolved in the aqueous phase, wherein the crosslinker has at least two functional groups independently selected from the group consisting of aldehyde, carboxylic acid, and carboxylate. The composition is sometimes referred to herein as a "crosslinkable chitosan-based composition." In an embodiment, the crosslinkable chitosan-based composition can be used as a treatment fluid in a well.

A method of treating a well is provided, the method including the step of introducing a composition according to the invention into a treatment zone of a well.

The invention can provide two important benefits: (1) reducing permeability of a subterranean formation; and (2) using composition materials that are friendly to the environment or "green" in nature.

In an embodiment, the zone is a water-producing zone. The method can be used to control water production from the zone, thereby promoting hydrocarbon production. In an embodiment, the methods can be used for reducing or shutting off water production from a zone in a well.

In another embodiment, the zone is a gas-producing zone. The method can be used to control gas production from the zone, thereby promoting oil production. In an embodiment, the methods can be used for reducing or shutting off gas production from a zone in a well.

Aqueous Phase

The aqueous phase used in the crosslinkable-polymer compositions of the present invention may include, but are not limited to, freshwater, seawater, saltwater, or brines (e.g., natural brines, formulated brines, saturated brines, unsaturated brines, etc.), or mixtures thereof. The aqueous fluid may be from any source, provided that it does not adversely affect the crosslinkable-polymer compositions of the present invention. Formulated brines may be made by dissolving one or more soluble salts in water, a natural brine, or seawater. Representative soluble salts include the chloride, bromide, acetate, and formate salts of potassium, sodium, calcium, magnesium, and zinc. The aqueous fluid may further comprise an organic or inorganic acid, or mixtures thereof, inter alia, to facilitate the dissolution of the chitosan-based compound, if desired.

Preferably, the aqueous phase is the continuous phase of a treatment fluid.

Preferably, the aqueous phase has or is adjusted to have a pH in the range of about 1 to about 4, and more preferably in the range of about 2 to about 3. Such pH ranges help dissolve or disperse a chitosan-based compound.

Chitosan

Chitosan is a linear polysaccharide composed of randomly distributed β-(1-4)-linked D-glucosamine (deacetylated unit) and N-acetyl-D-glucosamine (acetylated unit). Chitosan is structurally similar to cellulose, except that the C-2 hydroxyl group in cellulose is substituted with a primary amine group in chitosan.

Chitosan occurs in nature and is non-toxic, biodegradable, and bio-compatible. Chitosan degrading enzymes, namely chitonases, chiosanases, and lysozymes that degrade chitin-derived materials occur in bacteria, fungi, algae mammals, birds, fish, etc. The biodegradability of chitosan is comparable to hydroxyethylcellulose (HEC).

Chitosan is a partially or fully deacetylated form of chitin. Chitin is a naturally occurring polysaccharide, which is the second most abundant natural product on earth preceded only by cellulose. Structurally, chitin is a polysaccharide consisting of beta-(1→4)2-acetamido-2-deoxy-D-glucose units, some of which are deacetylated. Chitin is not one polymer with a fixed stoichiometry, but a class of polymers of N-acetylglucosamine with different crystal structures and degrees of deacetylation and with fairly large variability from species to species. Typically, chitosan has a degree of deacetylation that is between 50% and 100%. The degree of deacetylation in the commercially available chitosan is usually in the 70 to 78% range.

The large number of free amine groups (pKa=6.3) makes chitosan a polymeric weak base. However, because chitosan is a polysaccharide containing many primary amine groups, it forms water-soluble salts with many organic and inorganic acids.

Chitosan dissolves in presence of diluted acidic solvents due to protonation of $NH_2$ groups at the C2 position. For example, chitosan is somewhat more soluble in dilute aqueous acids, usually carboxylic acids, as the chitosonium salt. Nevertheless, the solubility of chitosan in acidified water, for example in acetic or hydrochloric acid, is still only in the 1 to 2% range. If the pH of the solution is increased above about 6, precipitation of chitosan occurs, inhibiting solubility of chitosan. The viscosity of aqueous chitosan depends on the molecular weight of the polymer.

Chitosan-Based Compounds

The crosslinkable-polymer compositions of the present invention generally comprise a chitosan-based compound. As used herein, the term "chitosan-based compound" is intended to include chitosan and chitosan salts of mineral or organic acids. The chitosan-based compound included in the crosslinkable compositions of the present invention may include unoxidized chitosan, oxidized chitosan, modified chitosan, derivatives thereof, or mixtures thereof.

Certain chitosan derivatives have a degree of deacetylation that is in the range of from about 50% to about 100%. In certain embodiments, such as commercially-available chitosan, the chitosan may have a degree of deacetylation that is in the range of from about 70% to about 78%.

In certain embodiments, the chitosan-based compound may include an oxidized chitosan-based compound. Suitable chitosan-based compounds that may be oxidized include, but are not limited to, chitosan and chitosan salts of mineral or organic acids. A wide variety of oxidizers may be used. Examples of suitable oxidizers include, but are not limited to sodium hypochlorite, sodium chlorite, sodium persulfate, sodium periodate, hydrogen peroxide, organic peroxides, peracetic acid, derivatives thereof, and mixtures thereof.

A commercial example of a chitosan derivative includes chitosan lactate, which is available from Vanson HaloSource and Hydagen HCMF which is available from Cognis.

Chitosan and its derivatives are easy to transport and store on field locations without posing safety hazards.

The chitosan-based compound should be included in the crosslinkable-polymer compositions of the present invention in an amount sufficient to provide the desired crosslinking interaction. In certain embodiments, the chitosan-based compound may be present in an amount in the range of from about 0.05% to about 5% by weight of the water of the aqueous phase. When oxidized chitosan is used, the chitosan-based compound may be present in an amount up to about 15% by weight of the water.

Crosslinker

The crosslinker has at least two functional groups independently selected from the group consisting of aldehyde, carboxylic acid, and carboxylate. The two functional groups should be capable of forming stable chemical bonds with amino or hydroxyl group on the hydrated polymer of chitosan. The aldehyde group is presently preferred. A dialdeyde is presently most preferred.

Preferably, such crosslinkers are additionally selected for being water soluble. More preferably, the crosslinker should be compatible with brines, such as brines of KCl, NaCl, CaCl2, and NaBr.

Preferably, the crosslinker is additionally selected for being environmentally acceptable. More preferably, the crosslinker is selected for being readily biodegradable. Suitable examples of such crosslinkers include ethanedial (also known as glyoxal), malondialdehyde (also known as propanedial), glutaraldehyde (also known as glutaric dialdehyde), citric acid, and alkali metal citrate (such as sodium or potassium citrate), and any combination thereof.

Such crosslinkers are easy to transport and store on field locations without posing safety hazards.

Figure 1:
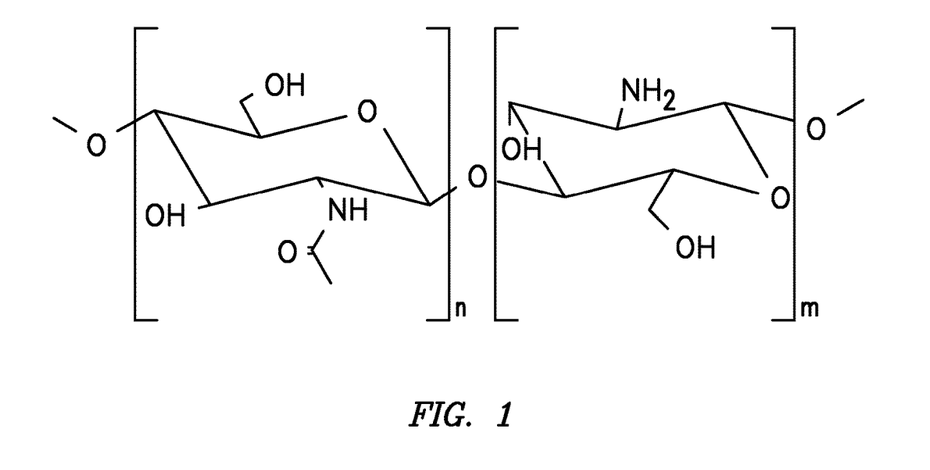
FIG. 1 illustrates the chemical structure of chitosan.
Figure 2A:
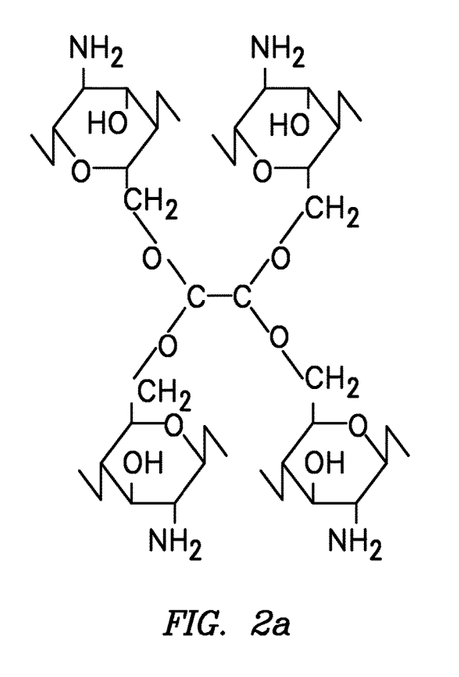
FIG. 2a illustrates crosslinking of chitosan through —CH$_2$OH groups.
Figure 2B:
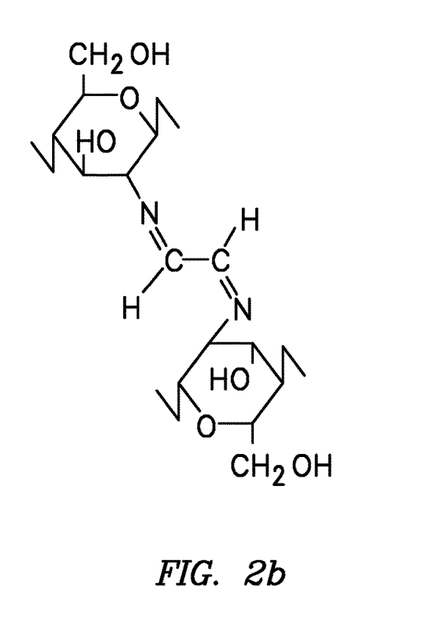
FIG. 2b illustrates crosslinking of chitosan through —NH$_2$ groups.
Figure 2C:
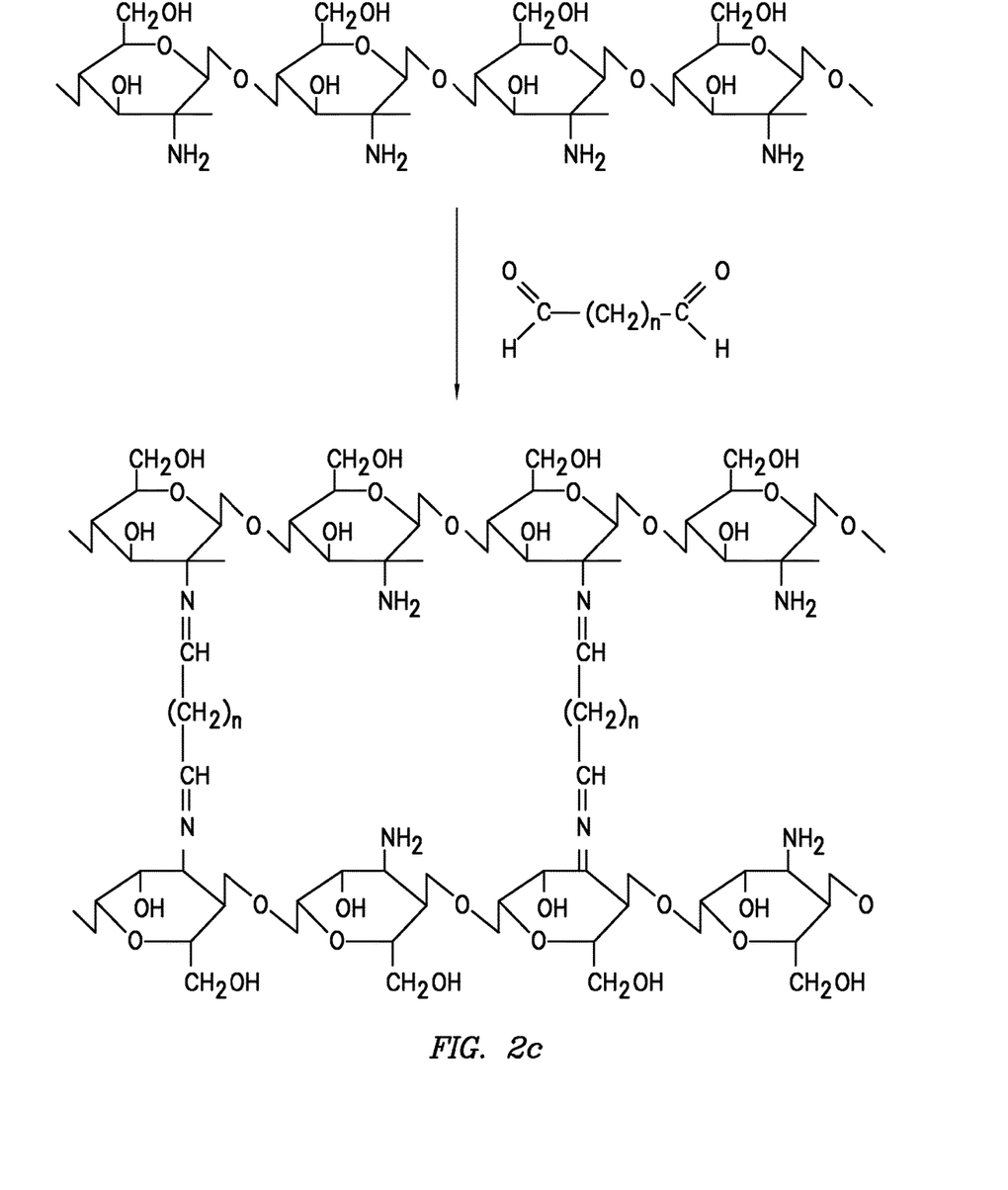
FIG. 2c illustrates a general mechanism of chitosan crosslinking with dialdehydes.

When the dissolved chitosan is mixed with a dialdehyde such as ethanedial (also known as glyoxal), it forms a crosslinked network through a —$CH_2OH$ or —$NH_2$ group, as illustrated in FIG. 2. Such dialdehydes show no precipitation with chitosan after mixing or at elevated temperatures.

The crosslinker generally should be included in the crosslinkable-polymer compositions of the present invention in an amount sufficient to provide the desired crosslinking interaction. In certain embodiments, the crosslinker is present in an amount in the range of from about 0.01% to about 5% by weight of the water of the aqueous phase. In certain embodiments, the crosslinker source is present in an amount in the range of from about 1% to about 3% by weight of the water.

Gelation and Gelation Time

The crosslinkable chitosan-based composition forms a gel that appears as a crystalline solid. Preferably, the gelled material is homogenous and stays in place under confined conditions, such as fractures and pore spaces in a subterranean formation. The gel is believed to be stable over a wide temperature range, including high temperatures. Such a gel can provides a conformance sealant for water control.

The time required for a crosslinkable-polymer composition to form the desired crosslinked gel can vary widely. This length of time, sometimes referred to as "gelation time," varies, depending on a number of factors, including the type of polymeric material, the type of crosslinking agent used, the type of aqueous fluid used, concentrations of components used, the pH, the temperature, and a variety of other factors. Delaying the gelation time of a crosslinkable-polymer composition may be desirable to allow, among other things, pumping of the composition to its desired location. The desired gelation time varies depending on the specific application. For instance, for wells of considerable depth or increased temperature, a longer gelation time may be required to deliver the crosslinkable-polymer composition to its desired destination before the composition forms the crosslinked gel.

In subterranean formations, a wide range of temperatures may be encountered that may present challenges to the use of crosslinkable-polymer compositions therein. For example, if the temperature of the subterranean formation is sufficiently high, the crosslinkable-polymer composition may gel prematurely. To counteract this possibility, oftentimes, the crosslinkable-polymer composition may be designed such that its gelation time is delayed or retarded. That is, the thickening and gelation characteristics of the crosslinkable-polymer composition may be altered such that the time it takes the crosslinkable-polymer composition to form a crosslinked gel is delayed for an amount of time sufficient to permit the crosslinkable-polymer composition to be pumped to its desired destination.

Gelation time can be controlled, for example, by encapsulating the crosslinker. Gelatin, starch, shellac, ethyl cellulose, poly(methyl methacrylate), polyvinylidene chloride, titanium dioxide, and any combinations of these. Examples of suitable degradable polymers include, but are not limited to, polysaccharides (such as dextran or cellulose); chitins; chitosans; proteins; aliphatic polyesters; polylactic acids; poly(glycolides); poly(ε-caprolactones); poly(hydroxy ester ethers); poly(hydroxybutyrates); poly(anhydrides); aliphatic polycarbonates; orthoester; poly(orthoesters); poly(amino acids); poly(ethylene oxides); poly(phosphazenes); poly etheresters, polyester amides, polyamides, and copolymers or blends of any of these degradable materials.

Among other factors, the gelation time can be controlled by controlling the concentration of the crosslinker in the crosslinkable chitosan-based composition. Preferably, the composition is adapted to provide a predictable and controllable pumping time, ranging from a few minutes to several hours at a design temperature. This allows the sealant to remain pumpable for sufficient time for placement and develops the network structure that leads to gelation, over a predictable period of time.

Well Fluid Additives

A treatment fluid according to the invention can contain additives that are commonly used in oil field applications, as known to those skilled in the art. For example, these include, but are not necessarily limited to, brines, inorganic water-soluble salts, salt substitutes (such as trimethyl ammonium chloride), pH control additives, particulates, viscosity-increasing agents, surfactants, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, bactericides, and combinations thereof.

The use of various well fluid additives can be used provided they are compatible with the crosslinking of the chitosan or the use of the crosslinked chitosan in a treatment.

Method Steps

The chitosan-based compound and the crosslinker can be introduced into the treatment zone according to any convenient techniques for introducing fluids that are known in the field. For example, it is contemplated that the chitosan-based compound and the crosslinker can be included in a single fluid. It is contemplated that the timing of the crosslinking can be controlled, for example, by encapsulation of the crosslinker or employing a slower reacting crosslinker. In addition, it is contemplated that the chitosan-based compound and the crosslinker can be introduced in separate fluids that mix downhole in a well to help control the timing of the crosslinking.

In general, a method of treating a treatment zone in a well is provided. The method includes the steps of: (A) introducing a treatment fluid according to the invention; and (B) shutting in the treatment zone.

In an embodiment, the treatment zone includes a portion of a subterranean formation having permeability greater than 0.1 milliDarcy for a gas reservoir or greater than 15 milliDarcy for an oil-reservoir.

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid of the present invention can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

Preferably, after introducing the chitosan and the crosslinker into the treatment zone, the method includes the step of shutting in the treatment zone. The step of shutting in is preferably for a sufficient time at the design temperature for crosslinking the chitosan in situ.

In an embodiment, the step of flowing back is within 48 hours of introducing the chitosan and crosslinker into the treatment zone. In another embodiment, the step of flowing back is within 24 hours. Preferably, the step of flowing back is within 4 hours of the step or steps of introducing.

Preferably, after any well treatment according to the invention, a step of producing hydrocarbon from the subterranean formation is the desirable objective.

Crosslinked Chitosan Applications

In certain embodiments, the compositions and methods of the present invention may be useful to alter, block, and/or control the flow of fluids in subterranean formations. Moreover, the crosslinkable-polymer compositions of the present invention may possess desirable environmental properties for performing such operations.

The invention can be used in producing wells or injection wells.

In an embodiment, the zone is a water-producing zone of a producing well. The method can be used to control water production from the zone, thereby promoting hydrocarbon production. In an embodiment, the methods can be used for reducing or shutting off water production from a zone in a well.

The amount of oil production may be monitored to determine if more crosslinked chitosan should be added to the zone to block additional permeable areas and thus improve oil production. If needed, additional crosslinked chitosan can be formed in the treatment zone. This procedure may be repeated until the amount of crosslinked chitosan is sufficient to achieve the desired amount of production.

In an embodiment, the crosslinked chitosan is formed in one or more injection wells after termination of the production stage of the primary well. Secondary and/or tertiary flooding operations may also be performed by displacing one or more injectants into an injection well and through the reservoir to drive additional oil from the reservoir to the production wells. The presence of the crosslinked chitosan in the permeable zones serves to substantially block or seal the flow pathways of the injectants through the permeable zones. Preferably, the crosslinked chitosan is placed prior to the displacing injectants. Advantageously, displacing injectants do not prematurely pass through the permeable zones to the production wells before having been introduced through areas of the reservoir-containing oil.

When used in injection applications, the injectant can be any suitable fluid for causing movement of oil in the flow direction of the fluids as they pass from an injection well through a reservoir containing the oil to a production well. Examples of suitable injectants include fresh water, brine, and gases such as carbon dioxide. Preferably, an aqueous solution serves as both the carrier fluid and an injectant. The chitosan and crosslinker can be introduced to an injectant stream as it is being pumped into an injection well such that the injectant stream also acts as the carrier fluid for the swelling agent.

The crosslinked chitosan can be utilized for reducing the permeability of a subterranean formation. Among other things, the method can be used for controlling produced water.

The crosslinkable chitosan-based composition provides a conformance sealant that utilizes environmentally friendly ingredients. The crosslinked chitosan can be used for environment friendly solution where current product may not be used thus improving the business.

The crosslinker shows no precipitation with chitosan after mixing or at elevated temperatures. The resulting gel is expected to be useful over a wide range of design temperatures.

CONCLUSION

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of treating a treatment zone in a well, the method comprising:
   introducing into the treatment zone a treatment fluid consisting of:
   (a) an aqueous phase having a pH below about 6;
   (b) a chitosan-based compound dispersed or dissolved in the aqueous phase; and
   (c) a crosslinker dispersed or dissolved in the aqueous phase, wherein the crosslinker is selected from the group consisting of: ethanedial, malondialdehyde, glutaraldehyde, citric acid, alkali metal citrate, and any combination thereof;
   allowing the crosslinker to crosslink the chitosan-based compound to form a crosslinked-treatment fluid; and
   allowing the crosslinked-treatment fluid to reduce the permeability of the treatment zone, wherein the aqueous phase has a pH of below about 6 when the treatment fluid is introduced into the treatment zone.

2. The composition according to claim 1, wherein the aqueous phase has a pH in the range of about 1 to about 4.

3. The method according to claim 1, wherein the treatment zone includes a portion of a subterranean formation that is a gas reservoir having permeability greater than 0.1 milli-Darcy.

4. The method according to claim 1, wherein the treatment zone includes a portion of a subterranean formation that is an oil reservoir having permeability greater than 15 milli-Darcy.

5. The method according to claim 1, further comprising, after the step of introducing, the step of shutting in the treatment zone for at least one hour.

6. The method according to claim 5, further comprising the step of flowing back from the treatment zone after the step of introducing.

7. The method according to claim 1, further comprising the step of flowing back from the treatment zone after the step of introducing.

8. The method according to claim 1, wherein the chitosan-based compound is chitosan.

* * * * *